United States Patent
Hanimann et al.

(10) Patent No.: US 8,470,220 B2
(45) Date of Patent: Jun. 25, 2013

(54) METHOD AND DEVICE FOR PRODUCING POLYESTER GRANULES AND/OR SHAPED PARTS WITH A LOW ACETALDEHYDE CONTENT

(75) Inventors: Kurt Hanimann, Rodels/Pratval (CH); Werner Stibal, Chur (CH)

(73) Assignee: UHDE Inventa-Fischer AG, Domat/Ems (CH)

( * ) Notice: Subject to any disclaimer, the term of this patent is extended or adjusted under 35 U.S.C. 154(b) by 0 days.

(21) Appl. No.: 11/721,003

(22) PCT Filed: Dec. 6, 2005

(86) PCT No.: PCT/CH2005/000723
§ 371 (c)(1),
(2), (4) Date: Jun. 2, 2009

(87) PCT Pub. No.: WO2006/060930
PCT Pub. Date: Jun. 15, 2006

(65) Prior Publication Data
US 2009/0302489 A1 Dec. 10, 2009

(30) Foreign Application Priority Data
Dec. 7, 2004 (CH) ........................ 2026/04

(51) Int. Cl.
*B29B 9/06* (2006.01)
(52) U.S. Cl.
USPC ............................ 264/141; 264/12
(58) Field of Classification Search
USPC ................................... 264/12, 141
See application file for complete search history.

(56) References Cited

U.S. PATENT DOCUMENTS
2,758,915 A * 8/1956 Vodonik ..................... 422/137
3,497,477 A   2/1970 Barkey et al.
(Continued)

FOREIGN PATENT DOCUMENTS
CA  2515692 A1 * 5/2005
EP  0 727 303 B1   8/1996
EP  0 968 243 B1   1/2000

OTHER PUBLICATIONS
Office Action in related Korean Patent Application No. 10-2007-7015405 dated Jun. 5, 2012.
(Continued)

*Primary Examiner* — Yogendra Gupta
*Assistant Examiner* — John Robitaille
(74) *Attorney, Agent, or Firm* — Millen, White, Zelano & Branigan, P.C.

(57) ABSTRACT

In the case of the method for the production of polyester granulate or molded articles from a melt which is discharged from a polycondensation (1), the melt in the discharge region (2) of the polycondensation is kept at a temperature between 270-285° C. in communication with a gas chamber at a reduced pressure in order according to the invention to achieve a low acetaldehyde content. With respect to the granulate, within the scope of the method according to the invention, a standard crystallization (5) and drying (6) with air as drying gas suffices. The molded articles can be produced directly from the melt, e.g. with an injection molding machine (9). The device according to the invention comprises a polycondensation, at least the last stage of which is configured as a disc reactor in which, with extensive avoidance of a sump, the melt is transported directly from disc to disc by a combination of rotating disc and static strippers fitted on the circumference of the reactor. In the discharge region, the melt is conveyed directly into the discharge unit by static strippers without an accumulation of melt occurring here.

28 Claims, 2 Drawing Sheets

U.S. PATENT DOCUMENTS

| | | | |
|---|---|---|---|
| 3,619,145 A * | 11/1971 | Crawford et al. | 422/134 |
| 4,064,112 A * | 12/1977 | Rothe et al. | 528/272 |
| 5,376,734 A | 12/1994 | Al Ghatta | |
| 5,648,032 A * | 7/1997 | Nelson et al. | 264/101 |
| 5,656,221 A * | 8/1997 | Schumann et al. | 264/85 |
| 5,656,719 A * | 8/1997 | Stibal et al. | 528/491 |
| 5,945,460 A * | 8/1999 | Ekart et al. | 521/48 |
| 6,274,212 B1 * | 8/2001 | Rule et al. | 428/36.92 |
| 6,284,866 B1 | 9/2001 | Schiavone | |
| 6,559,271 B2 * | 5/2003 | Schaaf et al. | 528/272 |
| 7,358,324 B2 * | 4/2008 | Chen et al. | 528/288 |

OTHER PUBLICATIONS

English Translation of Office Action in related Korean Patent Application No. 10-2007-7015405 dated Jun. 5, 2012.

Office Action for related Indian Patent Application No. 4335/DELN/2007, dated Sep. 17, 2012.

* cited by examiner

METHOD AND DEVICE FOR PRODUCING POLYESTER GRANULES AND/OR SHAPED PARTS WITH A LOW ACETALDEHYDE CONTENT

TECHNICAL FIELD

The present invention relates to a method and a device for the production of polyester granulate and/or moulded articles with a low acetaldehyde content from a melt which is discharged from a polycondensation.

The polyester can concern in particular polyethylene terephthalate or modified copolymers thereof with modification components on the acid side, e.g. of isophthalic acid, or on the diol side, e.g. of cyclohexadimethanol. The material is suitable in particular as packaging material in the form of films, foils or also hollow bodies such as e.g. bottles.

During the production of the material and also its further processing, at the temperatures thereby used for the application, acetaldehyde (subsequently also: AA) is produced as an undesired byproduct as a result of thermal damage, the AA content in the melt directly after the discharge unit being normally 20-100 ppm. AA is very odour- and taste-intensive and is troublesome above all in the food industry because it also diffuses into the foodstuffs in the cold state. For the drinks industry, the following limit values for the AA content in the preforms have been established: 1-3 ppm for water applications and 4-10 ppm for sweet drinks (CSDs). This means that the AA content must be drastically reduced at least for these applications.

STATE OF THE ART

Various methods are already known for reducing the AA content:

A first method of this type resides in binding the AA chemically by addition of additives, so-called AA blockers. However these additives can lead to yellowing and/or clouding of the material. In addition, the AA blockers must fulfil the requirements of the food industry. Their use is therefore possible only in a restricted manner. It is normal to meter AA blockers for high requirements, such as e.g. for water, directly during injection moulding in order to compensate in addition also for the formation of AA hereby occurring.

A further method resides in evaporating AA at elevated temperatures below the melting point. As a rule, this is effected in combination with a solid phase post-condensation, the polycondensation degree being increased at a temperature between 190-230° and AA being precipitated at the same time. In order to avoid thermooxidative damage, this is implemented in a flow of an inert gas, such as nitrogen. The thus obtained granulate typically has a content of AA of less than 1 ppm. The treatment is however overall complex, requires large apparatus, takes approximately a whole day and consumes a lot of energy. The method is also only applicable for granulate, however not if the melt coming from the polycondensation is supplied directly e.g. to an injection moulding machine for the production of preforms.

Subsequent treatment of the granulate with air in order to remove AA is basically also possible. However since the temperature must be kept comparatively low hereby to avoid thermooxidative damage, the reduction of the AA takes a relatively long time. In addition, for a standard-produced granulate without the mentioned solid phase post-condensation, the low AA values required above all for food packagings cannot be achieved in this way.

A method for reducing the AA content is known from EP 0 727 303 in which the melt is subjected to a vacuum after discharge from the polycondensation by means of a multishaft reactor so that the result is evaporation of the AA. The evaporation can be assisted further by a flow of inert gas. In EP 0 968 243 nitrogen is therefore mixed into the melt and the AA is released during the subsequent flash expansion. Although it is mentioned in EP 0 727 303 that extremely low AA contents can be achieved with an adequate surface regeneration rate and under a vacuum, this method has not been able to date to be established as a result of the high equipment outlay required therefor.

Disc reactors have been established in the state of the art as the last stage of polycondensation reactors for polyester. FIG. 2 shows a schematic representation of such a type of reactor. Disc reactors operate according to the principle that a horizontally situated cylindrical apparatus 20 with a diameter between 50 cm and 500 cm is filled with melt up to approx. a quarter to at most half by control of the continuous product input (product in) and discharge (product out). Above the melt a vacuum prevails (vapour out). From the melt sump 21, illustrated in a dotted line, rotating discs which are disposed on a longitudinal shaft 22 or on a basket-like structure and only two of which are designated by 23, draw the melt upwards and allow it to flow away gravimetrically, as a result of which a large surface of the melt is generated relative to the free space (vacuum).

The level gradient forming in the sump 21 ensures inter alia the longitudinal flow of the melt through the reactor. It is normally controlled by static fittings, such as e.g. weirs, only two of which are designated by 24, and the arrangement and speed of rotation of the rotating discs 23 in the reactor. The sump 21 serves above all for ensuring uniform loading of the discs 23 with melt. In the last section of the reactor, the so-called discharge region 25 in which the melt flows with increased viscosity towards the discharge unit, this sump serves as store for continuous filling of the discharge unit or the pump 26. The inflow pressure on the discharge unit 26 is normally increased even more by arrangement of the discharge unit at a specific spacing from the base of the cylindrical apparatus 20 at the lower end of a collection outlet 27. The height of the liquid column here can be up to 200 cm.

In the case of this method, as a result of thermal degradation, byproducts are formed constantly in the melt, above all acetaldehyde.

On the product surface subjected to the vacuum and also up to at most approx. 3 mm depth, the acetaldehyde can evaporate out of the melt because of the phase equilibrium so that a very small AA content arises there in the melt. This is the case above all on the discs 23 where thin product layers are formed. The acetaldehyde formed in the thick sump layer 21 can in contrast diffuse only to a very small extent to the surface and consequently is concentrated in the melt. If the discharge region 25 with the mentioned collection outlet 27 is included in which the entire polymer is likewise no longer in contact with the vacuum in the reactor, the AA content can be already significantly greater than 10 ppm up to the discharge unit 26 in the case of this method.

PRESENTATION OF THE INVENTION

The object of the invention is to indicate how the AA content can be reduced more simply and more economically. This object is achieved according to the invention by a method as characterised in patent claim 1. A device for implementing the method is indicated in patent claim 19.

In the case of the method according to the invention, the melt in the discharge region of a polycondensation is kept at a temperature between 270-285° C. in communication with a gas chamber at a reduced pressure.

In the discharge region of the polycondensation, normally substantially higher temperatures are operated, namely between 285-295° C. As a result of the lower temperature according to the invention of between 270-285° C., the level of thermal damage to the polymer material which is causal for the formation of the AA is kept low. Consequently in the discharge region of the polycondensation less AA is produced from the start than is normal according to the state of the art. The temperature reduction according to the invention is possible by means of skilled control of the melt flow in the reactor.

In addition, differently from what is normal in prior art, contact of the melt with a gas chamber at reduced pressure into which AA can evaporate, is produced in the discharge region of the polycondenstion. This corresponds per se to the teaching of the mentioned EP 0 727 303 but with the difference that it is configured already in the polycondensation without great additional complexity.

As a result of the low temperature in the discharge region of the polycondensation and consequently the low thermal damage to the polymer material, the formation potential for AA to be present is low so that the AA content in the melt cannot rise drastically even during further processing thereof. Merely a low AA content is therefore produced also in the granulate produced from the melt and/or in the preforms produced from the melt.

The temperature of the melt in the discharge region of the polycondensation is preferably set at a value between 275-280° C.

The pressure in the gas chamber is kept preferably below 2 mbar, more preferably below 1 mbar.

As long as the melt is discharged with a discharge unit, such as e.g. a discharge pump, from the discharge region of the polycondensation, it is favourable if the melt is kept in contact with the gas chamber at reduced pressure up to the discharge unit. The sump which is normal there should not be formed in front of the discharge unit.

The preferred device for implementing the method according to the invention has, according to patent claim 19, a novel disc reactor in which a sump is extensively dispensed with. For this purpose, the melt is transported directly from disc to disc by a combination of rotating discs and static strippers fitted on the circumference of the reactor. In the discharge region, the melt is conveyed directly into the discharge unit by static strippers without an accumulation of melt occurring here also.

The disc structure of the novel disc reactor is chosen such that no thick layers are produced and the exchange of product is ensured at the disc. The discharge pump is flanged onto the reactor directly with a rectangular inlet flange and is disposed below the last strippers and discs of the agitator. The thickness of the melt layers in the entire reactor can be kept below 10 cm, predominantly even below 3 cm. The new arrangement allows controlled guidance of the melt on the discs and also in the longitudinal direction of the reactor, in particular even in the case of high polymerisation degrees and at a relatively low temperature.

According to the invention, the melt leaves the polycondensation with an AA content of approx. 0 ppm. However AA contents of less than 5 ppm are achievable in any event. This implies a drastic reduction in comparison with the AA content between 20-50 ppm which is normal per se at the outlet of the polycondensation directly after the discharge unit. In the amorphous granulate, the AA content is consequently reduced to <10 ppm, in comparison with >50 ppm in the case of the conventional method.

In order that the melt can be used after discharge thereof from the polycondensation inter alia directly for the production of preforms on an injection moulding machine, it can be adjusted in the polycondensation, e.g. by using a polycondensation reactor (high-viscous finisher), to an intrinsic viscosity between 0.5-0.9 dl/g, in particular between 0.70-0.85 dl/g.

If the melt is discharged from the polycondensation into at least one melt pipe, it is preferred if the melt is kept in the same temperature range in this at least one melt pipe, as was indicated previously for the discharge region of the polycondensation, so that the result is not in addition thermal damage to the polymer material in the melt pipe.

Since the formation potential of AA in the melt is not entirely avoidable even within the scope of the method according to the invention, it is generally favourable for a low AA content in the granulate and/or in the preforms if the dwell time of the melt in the melt pipe(s) up till granulation and/or in the device used for the production of the preforms (e.g. injection moulding machine) is as short as possible. The dwell time in the melt pipe up to granulation should preferably not exceed 3 min, in particular 1 min. Up till the device for the production of preforms, the melt in the melt pipe should have a dwell time <5 min, preferably <3 min.

In the case of conventional methods, the dwell time of the melt after the polycondensation until granulation or shaping in the melt pipe or pipes is significantly longer and is between 15 and 30 min. In order to achieve the short dwell times according to the invention, special construction precautions and outlay configurations are required, such as e.g. the use of gear pumps which are subjected to a diagonal flow for increasing the pressure in the melt pipe or pipes and/or the use of melt filters of the screen changer type with candle filters fitted instead of the flat screens normally used.

Granulation can take place in the normal way by means of strand granulators having a subsequent standard crystallisation in which the granulate is moved for example by an agitator or in a fluidised bed and is dried with a drying gas at 150-200° C. Preferably air is used as drying gas and the drying is implemented at 165-175° C.

The granulation can also be implemented by hot cutting with subsequent direct crystallisation using the inherent heat of the granulate (latent heat crystallisation) and also with drying, as indicated above.

In the case of both crystallisations and subsequent dryings, the AA content in the granulate is reduced from <10 ppm to at least <2 ppm. Using all the described measures, a granulate with an AA content of about 1 ppm can be obtained according to the method according to the invention.

Within the scope of the method according to the invention, normal solid phase post-condensation of the granulate which is normal in prior art can be therefore dispensed with particularly advantageously in order to reduce the AA content. As a result, the plants required for such a post-condensation are not required and there are savings in time and energy. Nitrogen as drying gas can also possibly be dispensed with because the mentioned crystallisations can also be implemented with air as drying gas. As a result of the solid phase post-condensation, the granulate obtains in addition non-uniform viscosity and high and non-uniform crystallinity which because of the high melting energy associated therewith is not desired. The increase in viscosity, which is achievable with the solid phase post-condensation, to the values required for the further processing can, as mentioned already, be achieved also in the polycondensation by means of suitable treatment of the melt.

As emerged surprisingly, with the granulate produced according to the invention, approximately the same AA level and approximately the same formation rate for AA is produced as with granulate which was produced with the initially mentioned standard method with inclusion of a solid phase postcondensation.

The initially mentioned possibility of using AA blockers to reduce the AA content is likewise of course still available within the scope of the method according to the invention and can be used additionally above all in the production of moulded articles directly from the melt. As a result, NA contents in the moulded articles of <5 ppm are achievable.

BRIEF EXPLANATION OF THE FIGURES

The invention is intended to be explained in more detail subsequently with reference to embodiments in conjunction with the drawing. There are shown.

WAYS OF CARRYING OUT THE INVENTION

Figure 1:
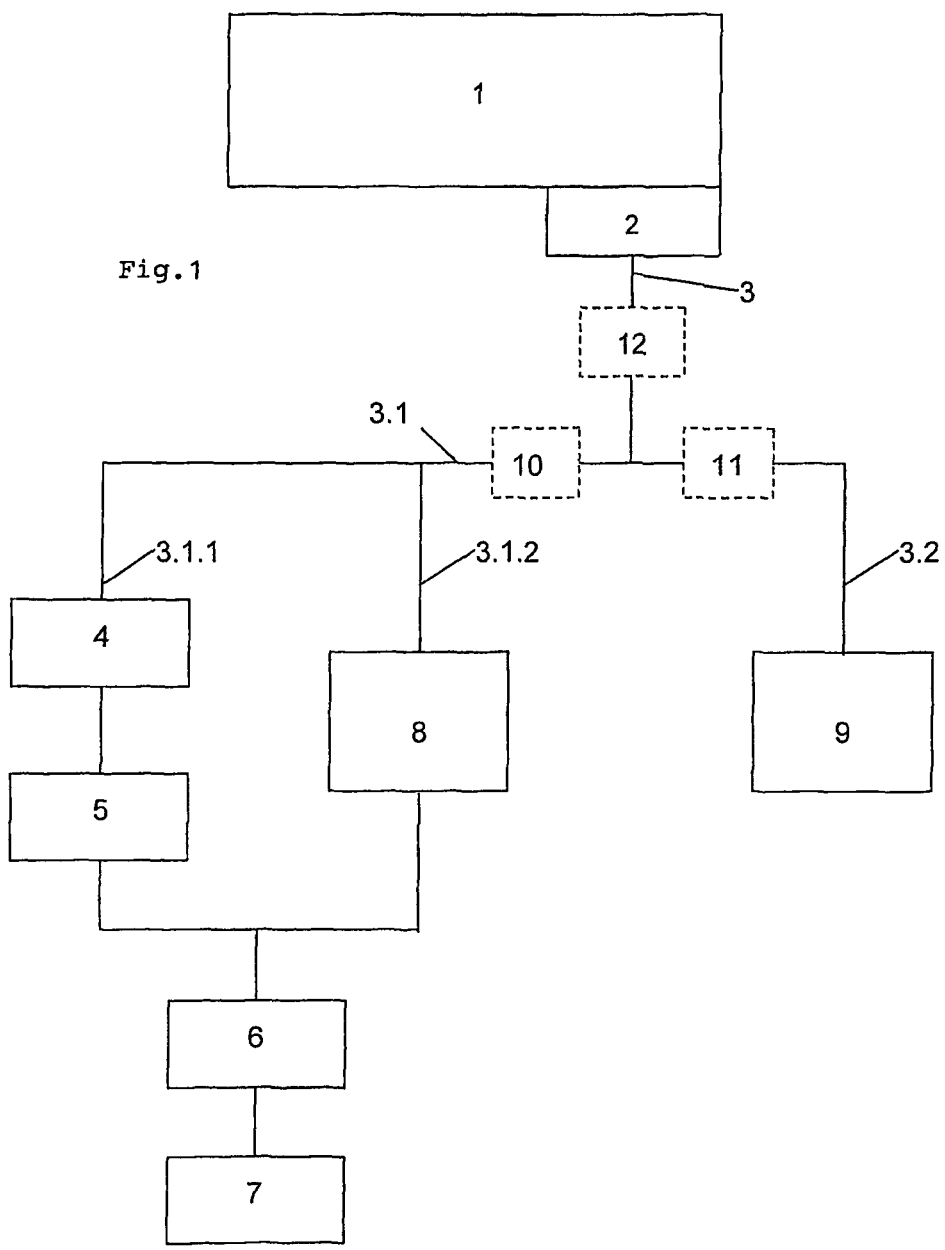
FIG. 1 in schematic representation, a plant for producing polyester granulate and/or polyester moulded articles with a low acetaldehyde content according to the invention.

In FIG. 1, a polycondensation reactor (e.g. DISCAGE® by the applicant) is designated with 1, in which a melt of a polyester material is produced. A discharge unit, which forms or seals at the same time the discharge region of the polycondensation reactor 1 and which can concern a discharge pump, is designated with 2.

Figure 3:
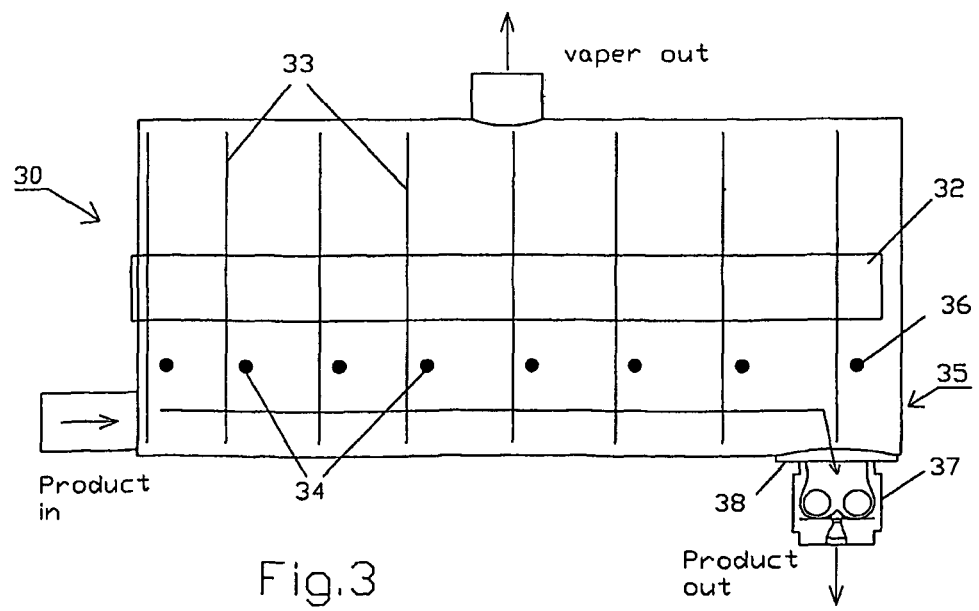
FIG. 3 a modified disc reactor which is particularly suitable for implementing the method according to the invention.

FIG. 3 shows a schematic representation of a novel polycondensation reactor which is used preferably within the scope of the invention.

Figure 2:
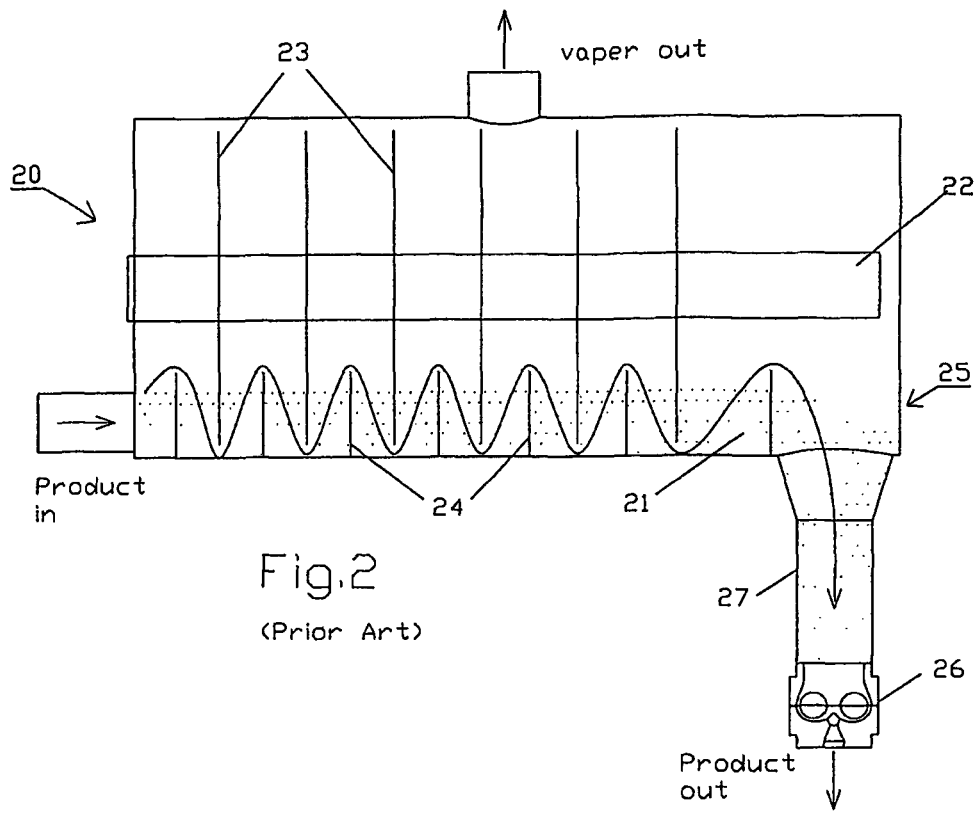
FIG. 2 in schematic representation, a disc reactor according to the state of the art.

The reactor of FIG. 3, like the reactor of FIG. 2 already mentioned initially, is a disc reactor in the form of a horizontally situated cylindrical apparatus 30 with discs which are disposed on a longitudinal shaft 32 or on a basket-like structure, only two of which are designated with 33. In contrast to the reactor of FIG. 2, here a sump which is unfavourable for the evaporation of any acetaldehyde produced is however extensively dispensed with. For this purpose, the melt is transported directly from disc to disc 33 by static strippers which are fitted on the circumference of the reactor, two of which are designated with 34. In the discharge region 35, the melt is conveyed directly into the discharge unit or pump 37 by static strippers 36 so that here also no accumulation of melt occurs. A collection outlet is also dispensed with. The pump 37 is flanged onto the reactor directly at a rectangular flange 38.

In the novel reactor, the continuous melt flow is in communication with a gas chamber at a reduced pressure in a thin layer everywhere up to the discharge region. The operation takes place just at the physical detachment limit.

Reference is made subsequently again to FIG. 1. The discharge unit 2 conveys the polyester melt from the polycondensation reactor 1 under pressure into a melt pipe 3 which subsequently is divided into legs 3.1 and 3.2. The leg 3.1 divides once again into the legs 3.1.1 and 3.1.2.

The leg 3.1.1 leads to a standard granulation 4, e.g. using a conventional strand granulator. The granulate formed by the latter is supplied to a standard crystallisation 5 in which the granulate is moved for example by an agitator or on a fluidised bed. Subsequent thereto is a drying stage 6 in which the granulate is dried, e.g. in a shaft dryer, in the flow of a hot drying gas. A container or a filling station for the finished granulate is designated with 7.

The leg 3.1.2 leads to a granulation 8 by hot cutting and with a direct crystallisation using the intrinsic heat of the granulate. The granulate produced thus is then supplied to the already mentioned drying stage 6 and passes via the latter likewise into the container or the filling stage 7. Alternatively, the operation can take place from the granulation by hot cutting directly into the drying stage 6. From there, the granulate passes then in turn to the filling station 7.

The leg 3.2 leads to a mould 9 with which a moulded article can be produced directly from the melt. The mould 9 can concern in particular an injection moulding machine and the moulded article a bottle preform.

In the leg 3.1, another injection point 10 in connection with a static mixer is represented in broken lines, via which an AA blocker can be injected if required into the melt. In the leg 3.2, a corresponding injection point is provided and designated with 11.

Finally another filter 12 could also be provided in the melt pipe 3.

EXAMPLES

In the subsequent table, in columns B-F, values for the intrinsic viscosity IV, the AA content and also for the crystallisation degree are indicated, as are achievable with a device according to FIG. 1, according to the method according to the invention for a polyester granulate before and after the drying stage or in the moulded article. Column A shows comparative values, as are typical for a method according to the state of the art with the inclusion of a solid phase postcondensation (SSP=solid state polycondensation) instead of the drying according to the invention. The polyester material in all examples is polyethylene terephthalate. For the examples according to the invention, a polycondensation reactor according to FIG. 3 was used within a continuous process. The IV values and the AA values were determined according to ASTM. The crystallisation degree was determined according to the density method using the following normal formula:

$$KG\ (\%) = \frac{\rho_c(\rho - \rho_a)}{\rho(\rho_c - \rho_a)}$$

the density of 100% crystalline PET being set at $\rho_c=1.455$ g/cm$^3$ and the density of amorphous PET at $\rho_a=1.332$ g/cm$^3$.

| After stage | Value | A | B | C | D | E | F |
|---|---|---|---|---|---|---|---|
| (a) Granulation | IV (dl/g) | 0.60 | 0.83 | 0.81 | 0.825 | | |
| | AA (ppm) | 54 | 12 | 8 | 2 | | |
| (b) Post-crystallisation, latent heat crystallisation | IV (dl/g) | | 0.83 | 0.81 | 0.825 | | |
| | AA (ppm) | | N/a | 6 | N/a | | |
| | KG (%) | | 42 | 30 | 41 | | |
| (c) SSP/ drying ("conditioning") | IV (dl/g) | 0.82 | 0.83 | 0.83 | 0.825 | | |
| | AA (ppm) | 0.9 | 1.5 | 0.9 | 0.8 | | |
| | KG (%) | 55 | 42 | 41 | 41 | | |
| (d) Moulded | IV (dl/g) | 0.81 | 0.825 | 0.83 | 0.82 | 0.83 | 0.825 |
| | AA (ppm) | 4 | 4.5 | 4 | 2 | 15 | 7.5 |

-continued

| After stage | Value | A | B | C | D | E | F |
|---|---|---|---|---|---|---|---|
| article/ hollow body | | | | | | | |

The process conditions were as follows:

Example A

Comparative Example (a) Granulation comprises:
Polycondensation reactor according to FIG. 2 (continuous melt polycondensation):

| | |
|---|---|
| temperature | 290° C. |
| vacuum | 1 mbar |
| dwell time in the melt pipe | 12 min |

(b) Post-crystallisation as "separate step" is omitted. Therefore no values.
(c) After SSP/drying:

| | |
|---|---|
| precrystallisation | 45 min at 200° C. |
| crystallisation | 60 min at 209° C. |
| SSP reactor | 12 h at 209° C. with $N_2$ as drying gas |

(d) Moulded article (injection after remelting of the granulate):

| | |
|---|---|
| temperature in the mould | 290° C. |
| dwell time in the melt | 50 sec |

Example B (a) Granulation comprises
Polycondensation reactor (continuous melt polycondensation):

| | |
|---|---|
| temperature | 276° C. |
| vacuum | 0.95 mbar |
| dwell time in the melt pipe | 1.5 min |

(b) Crystallisation:

| | |
|---|---|
| in the fluidised bed | 60 min at 170° C. |

(c) Drying:

| | |
|---|---|
| in the shaft dryer | 12 h at 170° C. with air as drying gas |

(d) Moulded article (injection after remelting of the granulate):

| | |
|---|---|
| temperature in the mould | 280° C. |
| dwell time in the melt | 50 sec |

Example C (a) Granulation comprises:
Polycondensation reactor (continuous melt polycondensation):

| | |
|---|---|
| temperature | 276° C. |
| vacuum | 0.95 mbar |
| dwell time in the melt pipe | 45 sec |

(b) Crystallisation:

| | |
|---|---|
| in the fluidised bed | 15 min at 170° C. |

(c) Drying:

| | |
|---|---|
| in the shaft dryer | 12 h at 170° C. with air as drying gas |

(d) Moulded article (injection after remelting of the granulate):

| | |
|---|---|
| temperature in the mould | 280° C. |
| dwell time in the melt | 50 sec |

Example D

Addition of 250 ppm of an AA blocker at the injection point 10 in the form of anthranil amides by the ColorMatrix Company, Knowsley, Merseyside, United Kingdom. Otherwise as example B.

Example E (a) Granulation comprises:
Polycondensation reactor (continuous melt polycondensation):

| | |
|---|---|
| temperature | 276° C. |
| vacuum | 0.95 mbar |
| dwell time in the melt pipe | 4 min |

(b), (c) are omitted as separate process steps: no values
(d) Moulded article (injection directly from the melt)

| temperature in the mould | 275° C. |
|---|---|
| dwell time in the melt | 30 sec |

Example F

Addition of 250 ppm of an AA blocker at the injection point 11 in the form of anthranil amides by the ColorMatrix Company, Knowsley, Merseyside, United Kingdom. Otherwise as in example E.

The indicated examples confirm that, according to the method according to the invention, approximately the same values for the intrinsic viscosity IV and also the AA content in the finished granulate and/or in directly produced moulded articles are produced, as are typical for corresponding products which are typical according to prior art with the inclusion in particular of a complex solid phase post-condensation. With additional use of AA blockers, the AA values can be reduced as far as is required inter alia for the production of water bottles. Even after remelting and further processing of granulate produced according to the invention, the AA values remain at a level comparable with the state of the art.

The division of the melt pipe 3 into a plurality of legs as illustrated in FIG. 1 and parallel application of different granulation and crystallisation methods or a direct production of moulded articles from the melt is merely by way of example. The invention could also be used merely with granulation or only for direct moulded article production. On the other hand, it would be possible to have further processes operating in parallel. By further division of the leg 3.2, in particular a plurality of moulds of the type of mould 9 of FIG. 1 could be operated in parallel.

REFERENCE NUMBER LIST

1 Polycondensation reactor
2 Discharge unit
3 Melt pipe
3.1 Partial leg of the melt pipe
3.1.1 Partial leg of the melt pipe
3.1.2 Partial leg of the melt pipe
3.2 Partial leg of the melt pipe
4 Granulation (strand granulator)
5 Standard crystallisation
6 Drying stage (shaft dryer)
7 Container or a filling station for the finished granulate
8 Granulation by hot cutting and with direct crystallisation
9 Mould for moulded articles (injection moulding machine)
10 Injection point for AA blockers
11 Injection point for AA blockers
12 Filter
20 Cylindrical apparatus
21 Melt sump
22 Longitudinal shaft or basket-like structures
23 Discs
24 Weirs
25 Discharge region
26 Discharge unit/pump
27 Collection outlet
30 Cylindrical apparatus
32 Longitudinal shaft or basket-like structures
33 Discs
34 Static strippers
35 Discharge region
36 Static strippers
37 Discharge unit/pump
38 Flange

The invention claimed is:

1. A method for the production of polyester granulate with a low acetaldehyde content from a melt which is discharged from a polycondensation reactor, comprising keeping the melt in the discharge region of the polycondensation at a temperature between 270-285° C. in communication with a gas chamber at a reduced pressure, by using a device comprising a polycondensation reactor, at least the last stage of which is configured as a disc reactor in which, with avoidance of a sump, the melt is transported directly from disc to disc by a combination of rotating discs and static strippers fitted on the circumference of the reactor and a discharge region, from which the melt is conveyed directly into a discharge unit by static strippers without an accumulation of melt occurring therein, and comprising discharging the melt from the polycondensation reactor into a melt pipe which leads to a granulation unit, wherein the melt in the melt pipe up to granulation unit has a dwell time <4 min.

2. The method according to claim 1, comprising keeping the melt in the discharge region of the polycondensation at a temperature between 275-280° C. in communication with a gas chamber at a reduced pressure.

3. The method according to claim 1, comprising keeping the pressure in the gas chamber below 2 mbar.

4. The method according to claim 1, wherein the melt is discharged by a discharge unit from a discharge region of the polycondensation, and the melt in the discharge region up to the discharge unit is kept in contact with a gas chamber at a reduced pressure.

5. The method according to claim 1, comprising keeping acetaldehyde content of the melt in the discharge region of the polycondensation at a value <5 ppm.

6. The method according to claim 1, comprising adjusting the melt in the discharge region of the polycondensation to an intrinsic viscosity between 0.5-0.9 dl/g.

7. The method according to claim 1, comprising discharging the melt from the polycondensation reactor into at least one melt pipe, and keeping the melt in the at least one melt pipe at a temperature between 270-285° C.

8. The method according to claim 1 and comprising discharging the melt from the polycondensation reactor into a melt pipe which leads to a granulation unit, wherein the melt in the melt pipe up to granulation unit has a dwell time <4 min.

9. The method according to claim 1, comprising further treating the granulate with a standard crystallization by movement and drying with a drying gas at a temperature between 150-200° C.

10. The method according to claim 1, comprising producing the granulate by hot cutting and further treatment with a direct crystallization using the inherent heat of the granulate and drying with a drying gas at a temperature between 150-200° C.

11. The method according to claim 9, wherein the drying is implemented with air as drying gas at a temperature <175° C.

12. The method according to claim 9, wherein the drying is implemented for 5-20 h.

13. The method according to claim 1, comprising adding acetaldehyde blockers to the melt before granulation.

14. The method according to claim 8, comprising filtering the melt in the melt pipe.

15. The method according to claim 1, comprising keeping the melt in the discharge region of the polycondensation at a layer thickness of less than 10 cm in communication with the gas chamber at a reduced pressure.

16. The method according to claim 1, comprising keeping the melt in the entire polycondensation at a temperature between 270-285° C. in communication with a gas chamber at a reduced pressure.

17. The method according to claim 1, conducted continuously.

18. A device for implementing the method according to claim 1, comprising a polycondensation reactor, at least the last stage of which is configured as a disc reactor in which, with avoidance of a sump, the melt is transported directly from disc to disc by a combination of rotating discs and static strippers fitted on the circumference of the reactor and a discharge region, from which the melt is conveyed directly into a discharge unit by static strippers without an accumulation of melt occurring therein.

19. The method according to claim 3, comprising keeping pressure in the gas chamber below 1 mbar.

20. The method according to claim 5, comprising keeping acetaldehyde content of the melt in the discharge region of the polycondensation at a value <2 ppm.

21. The method according to claim 6, comprising adjusting the melt by use of a high viscous finisher.

22. The method according to claim 6, comprising adjusting intrinsic viscosity to between 0.70-0.85 dl/g.

23. The method according to claim 7, comprising discharging the melt from the polycondensation reactor into at least one melt pipe, and keeping the melt in the at least one melt pipe at a temperature between 275-280° C.

24. The method according to claim 8, wherein the melt in the melt pipe up to granulation unit has a dwell time <2 min.

25. The method according to claim 8, wherein the melt in the melt pipe up to granulation unit has a dwell time <1 min.

26. The method according to claim 9, comprising producing the granulate by hot cutting and further treating with a direct crystallization using the inherent heat on the granulate and drying with a drying gas at a temperature between 165-175° C.

27. The method according to claim 10, comprising producing the granulate by hot cutting and further treating with a direct crystallization using the inherent heat on the granulate and drying with a drying gas at a temperature between 165-175° C.

28. The method according to claim 12, wherein drying is implemented during 10-15 h.

* * * * *